United States Patent
Buckley (10) Patent No.: US 7,171,203 B2
(45) Date of Patent: Jan. 30, 2007

(54) APPARATUS, AND ASSOCIATED METHOD, FOR FACILITATING SELECTION BY A MOBILE NODE OF A NETWORK THROUGH WHICH TO COMMUNICATE

(75) Inventor: Adrian Buckley, Brentwood, CA (US)

(73) Assignee: Research In Motion Limited, Waterloo (CA)

( * ) Notice: Subject to any disclaimer, the term of this patent is extended or adjusted under 35 U.S.C. 154(b) by 428 days.

(21) Appl. No.: 10/786,559

(22) Filed: Feb. 25, 2004

(65) Prior Publication Data
US 2005/0147060 A1 Jul. 7, 2005

Related U.S. Application Data

(60) Provisional application No. 60/534,821, filed on Jan. 7, 2004.

(51) Int. Cl.
*H04Q 7/20* (2006.01)
(52) U.S. Cl. .................. 455/435.2; 455/434; 455/525; 370/328; 370/252
(58) Field of Classification Search ............ 455/435.2, 455/434, 432, 525; 370/328, 353
See application file for complete search history.

(56) References Cited

U.S. PATENT DOCUMENTS

| 5,999,811 A | 12/1999 | Molne |
| 6,044,265 A | 3/2000 | Roach, Jr. |
| 6,625,451 B1 * | 9/2003 | La Medica et al. ......... 455/434 |

OTHER PUBLICATIONS

Juha Ala-Laurila, Jouni Mikkonen, and Jyri Rinnemaa, Nokia Mobile Phones; Wireless LAN Access Network Architecture for Mobile Operators; IEEE Communications Magazine; Nov. 2001.

* cited by examiner

*Primary Examiner*—Jean Gelin
*Assistant Examiner*—S. Smith (57) ABSTRACT

Apparatus, and an associated method, for a mobile node operable in a radio communication system formed of multiple networks. A listing is maintained at the mobile node containing entries that identify which networks with which the mobile node is permitted to communicate. A detector detects networks within communication range of the mobile node. Identities of the networks are obtained, and selection of one or more networks for which the mobile node to attempt to communicate is made based upon the stored entries and the detected networks.

20 Claims, 4 Drawing Sheets

APPARATUS, AND ASSOCIATED METHOD, FOR FACILITATING SELECTION BY A MOBILE NODE OF A NETWORK THROUGH WHICH TO COMMUNICATE

CROSS-REFERENCE TO RELATED APPLICATIONS

This application claims the priority of Provisional Patent Application No. 60/534,821, filed on 7 Jan. 2004, the contents of which are incorporated by their entirety herein.

The present invention relates generally to a manner by which to facilitate selection of with which network of a group of available networks that a mobile node attempts to communicate. More particularly, the present invention relates to apparatus, and an associated method, by which to limit selection of the network with which the mobile node attempts to communicate to a defined set of networks. The identities of the networks of the defined set are stored at the mobile node, and the mobile node detects which networks are within the communication range of the mobile node. The mobile node is permitted to attempt to communicate with a network that is both within communication range and also a network of the defined set.

A mobile node that is to be operated in communication connectivity with a particular WLAN (Wireless Local Area Network), or set of WLANs, attempts to communicate with only the WLAN or WLANs identified in the defined set and also determined to be available. Radio resources are conserved as the mobile node does not attempt to communicate with WLANs that are detected to be within communication range of the mobile node but not listed in the defined set of networks.

BACKGROUND OF THE INVENTION

The use of modern communication systems through which to communicate is a necessary aspect of modern society. Many different communication services are regularly effectuated by many different users to effectuate many different types of communication services. Many essential, as well as many other, services are predicated upon the ready availability of, and ready access to, communication systems.

As advancements in communication technologies continue, additional communication services, as well as improvements to existing communication services, shall likely become available. Generally, the advancements in communication technologies provide manners by which to communicate data, communicated to effectuate a communication service, in more efficient manner, or at higher data communication rates, or in manners that better provide for successful delivery of data to a receiving station in spite of adverse communication conditions.

The use of digital communication techniques, for instance, has been made possible as a result of technological advancements in communication technologies. Many modern communication systems utilize digital communication techniques. The use of digital communication techniques provides various advantages. By digitizing data, redundancies in the data are more readily removed, permitting the data to be communicated in more efficient form, free of redundancies. Improved data throughput rates or reduced bandwidth requirements needed to communicate the data are permitted.

A radio communication system is an exemplary type of communication system. Digital communication techniques are regularly utilized in many modern radio communication systems.

A cellular communication system is an exemplary type of radio communication system. While cellular communication systems are constructed to be operable in conformity with any of various operating standards, the cellular communication systems generally include network infrastructures having a plurality of spaced-apart base transceiver stations. The base transceiver stations each define cells, and portable communication stations, carried by users, are generally able to communicate with a base transceiver station in whose cell that the portable communication station is positioned when communications are effectuated.

Several analogous types of wireless communication systems have been implemented, and others have been proposed, to encompass limited areas, for example, areas encompassed by a business office or building structure. So-called micro-cellular networks, private networks, and WLANs (Wireless Local Area Networks) are representative of radio communication systems that are operable, at least in various aspects, in manners analogous to operation of a cellular communication system. Additionally, communication systems that utilize ad hoc networks, i.e., do not utilize a fixed network, are also utilized or undergoing development. Wireless local area networks are related to conventional, wireline local area networks and, in various respects, are merely extensions to the wireline local area networks. Data communicated in wireline local area networks are typically formatted pursuant to packet formatting schemes and data is communicated to effectuate a communication service by way of communication of one or more data packets.

Wireless communication systems, such as the aforementioned wireless local area networks are generally constructed to be operable in conformity with the operating protocols of a selected communication standard. While various promulgated operating standards have achieved widespread adoption, many wireless local area networks are constructed to be operable in conformity with an IEEE 802.11(b), operating specification, or a variant thereof. The IEEE 802.11(b) standard is promulgated by the IEEE, and the operating specification has become a predominant wireless LAN standard pertaining to a commercial 2.4 GHz wireless LAN (Local Area Network) frequency range as well as an unregulated band in the 5 GHz frequency range. The 802.11(b) standard specifies, amongst other things, an over the air interface between a wireless client, e.g., a mobile node, and a base station or access point.

Unlike some other communication systems implemented at other frequency bands, the frequency bands allocated for wireless local area networks are relatively unregulated, permitting their speedy deployment and re-deployment, as needed.

Mobile nodes operable in wireless local area networks are typically constructed to monitor selected frequencies within the allocated frequency bands to detect a wireless local area network within communication range of the mobile node. Access points, or other devices, of a wireless local area network broadcast signals to alert mobile nodes of the wireless local area networks of which the access points, or other devices, form portions. The signals broadcast by the access points or other devices identify the wireless local area network from which the signal is broadcast by an identifier, such as an SSID (Service Set Identifier).

Wireless local area networks are generally not public networks, and access to communicate therethrough by a mobile node is sometimes limited. That is to say, wireless local area networks are generally not public-access networks, but, rather, are generally private-access networks. And, more generally, mobile nodes are typically intended to be used to communicate with a selected one, or group, of wireless local area networks.

But, conventional mobile nodes generally monitor broadcasts of signals generated by any wireless local area network within the designated frequency band, or bands, within detection range of the mobile node. And, if signals are detected, a mobile node might attempt to communicate by way of the detected wireless local area network, even though the mobile node is not otherwise permitted to communicate therethrough and access to communicate therethrough shall be denied. Radio resources are unduly utilized through such attempts.

A manner is therefore needed by which to limit the attempts by a mobile node to communicate with a wireless local area network through which the mobile node would not be permitted to communicate.

It is in light of this background information related to communications by way of wireless local area networks that the significant improvements of the present invention have evolved.

SUMMARY OF THE INVENTION

The present invention, accordingly, advantageously provides apparatus, and an associated method, by which to facilitate selection of with which network of a group of available networks operable within at least a selected frequency band through which a mobile node attempts to communicate.

Through operation of an embodiment of the present invention, therefore, a manner is provided by which to limit selection of a network with which the mobile node attempts to communicate to a defined set of networks.

Identities of the networks, such as the SSIDs (Service Set Identifiers) of the networks, of the defined set, are stored at the mobile node. The mobile node monitors the frequencies of the selected frequency band or bands. And, the mobile node detects which networks are within communication range of the mobile node by detecting broadcasts of signals by networks within the communication range of the mobile node.

The mobile node is permitted to attempt to communicate with a network that is both within the communication range of the mobile node and that is also a network of the defined set. A determination is made as to whether the networks detected to be within the communication range of the mobile node are listed in the defined set of networks stored at the mobile node. The mobile node attempts to access and communicate through one or more of the networks that both are within the communication range of the mobile node and listed in the defined set. Thereby, during operation, a mobile node that is to be operated in communication connectivity with a particular wireless local area network, or group of wireless local area networks, attempts to communicate with only the network or networks listed in the defined set. Radio resources are conserved as the mobile node does not attempt to communicate with wireless local area networks that are detected to be within communication of the mobile node, but are not listed in the defined set.

In one aspect of the present invention, the defined set is stored at a storage element embodied at the mobile node. The storage element, for instance, is defined at a removable memory element, such as a subscriber identity module, or the like. The storage element is at least selectably updatable, formed, e.g., of a programmable read-only memory, or other updatable memory construction.

The identities of the networks, defined, e.g., in terms of their SSIDs, are contained in lists at the storage element. In one implementation, the mobile node is alternately operable at a first frequency band and at a second frequency band. For instance, in one implementation, the mobile node is operable at a 2.4 GHz frequency band and at a 5.0 GHz frequency band, each of which are allocated for regulated and unregulated, respectively, use by wireless local area networks. The storage element contains separate listings, a first listing associated with the first frequency band and a second listing associated with the second frequency band. Identifiers of networks with which the mobile node is permitted to communicate within the first frequency band are contained in the first listing. And, identities of the networks with which the mobile node is permitted to communicate in the second frequency band are contained in the second listing. In another implementation, the identities of the networks with which the mobile node is permitted to communicate in both of the frequency bands are listed in a common listing.

In a further aspect of the present invention, updating of the listings is selectably permitted. The listing is password-protected permitting updating of the entries contained in the listing pursuant to a two-step procedure in which a password is entered and accepted, and the listing is thereafter permitted to be updated. When the storage element contains multiple listings, in one implementation, a separate password is associated with the separate listings. And, in another implementation, each entry is separately password-protected. And, the individual entry is permitted to be updated or otherwise altered pursuant to a two-step operation in which a password is first entered and then the entry is updated or otherwise altered.

The mobile node monitors the frequency bands in which the mobile node is operable, thereby to detect control-information broadcast of data communicated upon control channels, in some systems the signals are referred to as beacon signals or pilot signals, and by detecting such signals, the mobile node detects the network or networks in whose coverage area that the mobile node is positioned. In some wireless local area networks, for instance, the networks are identified by service set identifiers, and the mobile node extracts values of the service set identifiers from the signals that are broadcast. The service set identifiers are compared with the values contained in the listing or listings of the storage element. And, the mobile node attempts to communicate only with a network in whose coverage area that the mobile node is positioned and whose identity is contained in the listing of the storage element.

As the mobile node is not permitted to attempt to communicate with a network whose identity is not contained in the listing, the mobile node does not attempt to communicate with a network with which the mobile node is not authorized to communicate. System resources are conserved as attempts to access such networks by the mobile node do not occur.

In these and other aspects, therefore, apparatus, and an associated method, is provided for a radio communication system having a mobile node. The mobile node is selectably operable to communicate data within at least a first selected frequency band within which a group of networks are operable to communicate. Selection of at least a first selected network of the group of networks with which to attempt, by the mobile node, to communicate the data is facilitated. A storage element is embodied at the mobile node. The storage element stores at least a first identifier that identifies the at least the first selected network. A detector is embodied at the mobile node. The detector detects which networks of the group of networks are within communication range of the mobile node. A selector is adapted to receive indications of the at least first identifier stored at the storage element and to receive indications of detections made by the detector. The selector selects which, if any, network of the group of networks, as the at least the first selected network with which to attempt to communicate the data. Selection is made by the selector of networks, if any, identified by the at least the first identifier and also detected by the detector to be within communication range.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
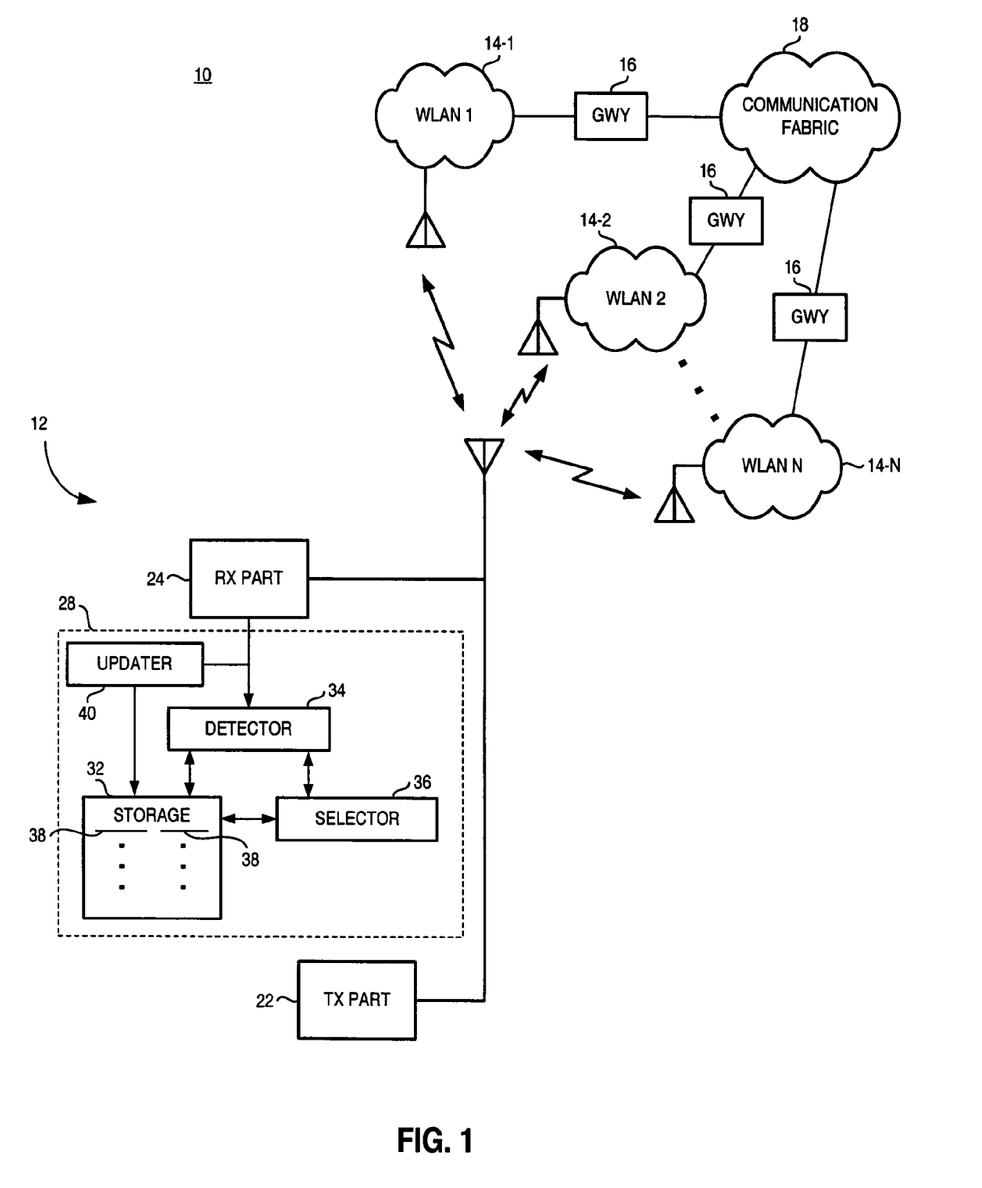
FIG. 1 illustrates a functional block diagram of a radio communication system in which an embodiment of the present invention is operable.

Referring to FIG. 1, a radio communication system, shown generally at 10, provides for radio communications with mobile nodes, of which the mobile node 12 is representative. The mobile node is permitted mobility and is movable to be positioned, at separate times, at separate locations. The mobile node here is operable to communicate pursuant to the operating parameters and protocols of an IEEE 802.11(b) operating standard. While the following description shall describe exemplary operation of the mobile node with respect to its implementation as an IEEE 802.11 (b) compliant device, in other implementations, the mobile node, as well as other entities of the communication system, are operable pursuant to other communication standards, such as a Bluetooth operating standard.

The communication system includes a plurality of wireless local area networks 14. Here, N networks, networks 14-1, 14-2, and 14-N are shown. The networks here also are operable to communicate in conformity with the operating standards of the IEEE 802.11(b) communication standard. The networks 14 are each coupled, by way of gateways (GWYs) 16 to a communication fabric 18 such as the Internet backbone.

The mobile node includes transceiver circuitry, here including a transmit part 22, and a receive part 24 permitting the mobile node to transceive signals during its operation. The mobile node further includes apparatus 28 of an embodiment of the present invention. The apparatus 28 is functionally represented, and the entities forming portions of the apparatus are implemented in any desired manner, including, for instance, algorithms executable by processing circuitry. Here, the apparatus includes a storage element 32, a detector 34, and a selector 36.

The storage element 32 includes storage locations at which values are stored that define a database forming a listing containing one or more entries 38. The entries identify, such as by SSID identifier, wireless local area networks with which the mobile node is permitted to attempt to form a connection. The values stored at the storage element forming the database is a fixed list. In one implementation, the entries in the database are updatable.

The detector is coupled to the receive part 24 and operates to monitor and detect signals broadcast by the wireless local area networks when the mobile node is within communication range of such networks to detect the broadcast signals. The detector is here shown functionally coupled to the storage element 32 and to the selector 36. The selector determines whether a selected network, identified, e.g., by its SSID value, is also listed in the database 38 formed at the storage element. If so, the mobile node is permitted to attempt to access the identified network to communicate therethrough. If, however, the detected network is not listed in the database, the mobile node is not permitted to attempt to communicate with the detected network.

In one implementation, the mobile node is operable at two separate frequency bands, such as at the 2.4 GHz and 5 GHz frequency bands. And, the storage element 32 includes separate lists of entries 38 containing entries of networks with which the mobile node is permitted to access at the separate frequency bands. Or, the listings are contained in a single database.

In the exemplary implementation, the apparatus further includes an updater 40. The updater selectably updates the listing or listings of entries 38. Update information is, e.g., downloaded to the mobile node. The listing of entries, or individual ones of the entries, are, in one implementation, further password protected. In this implementation, the updater further operates as, or includes, a comparator for comparing the passwords of stored information together with passwords of update information. Updating is permitted if comparisons indicate matched values of the passwords.

In the method of operation, the entries are stored at the storage element of the database, such as during configuration of the mobile node or through downloading of data to the mobile node. Once stored, and the mobile node is powered to monitor the frequency bands in which the mobile node is operable, the detector operates to monitor and detect signals sent by the local area networks. When a signal is detected, and the SSID of the broadcasting network is identified, the storage element is accessed to determine whether the identified network is also listed at the storage element. If so, the selector permits the mobile node to attempt to communicate with the identified network. Otherwise, the mobile node is prohibited from attempting to communicate by way of the network.

In one implementation, if more than one SSID is contained in the listing, the selector chooses the SSID that is first identified, such as the SSID listed at the top of the list. If communications are not effectuable with the identified network, then an alternate network is selected, the identity of which the detector also detects.

In an implementation in which the listing is updatable, the listing is protected, e.g., by a password. Alternately, each entry on the listing is protected by a separate password.

Entry of the proper password permits the associated information to be altered, deleted, added-to, or otherwise modified. Both a listing password and an individual entry password are required in another implementation.

In one implementation, the storage element is embodied at a WLAN mobile node, an RUIM, or a (U)SIM.

Through operation of an embodiment of the present invention, a manner is provided by which more efficiently to utilize radio resources as a mobile node is permitted to attempt to communicate only with wireless local area networks in whose coverage areas that the mobile node is positioned and whose identifiers are contained in a listing maintained at the mobile node.

Figure 2:
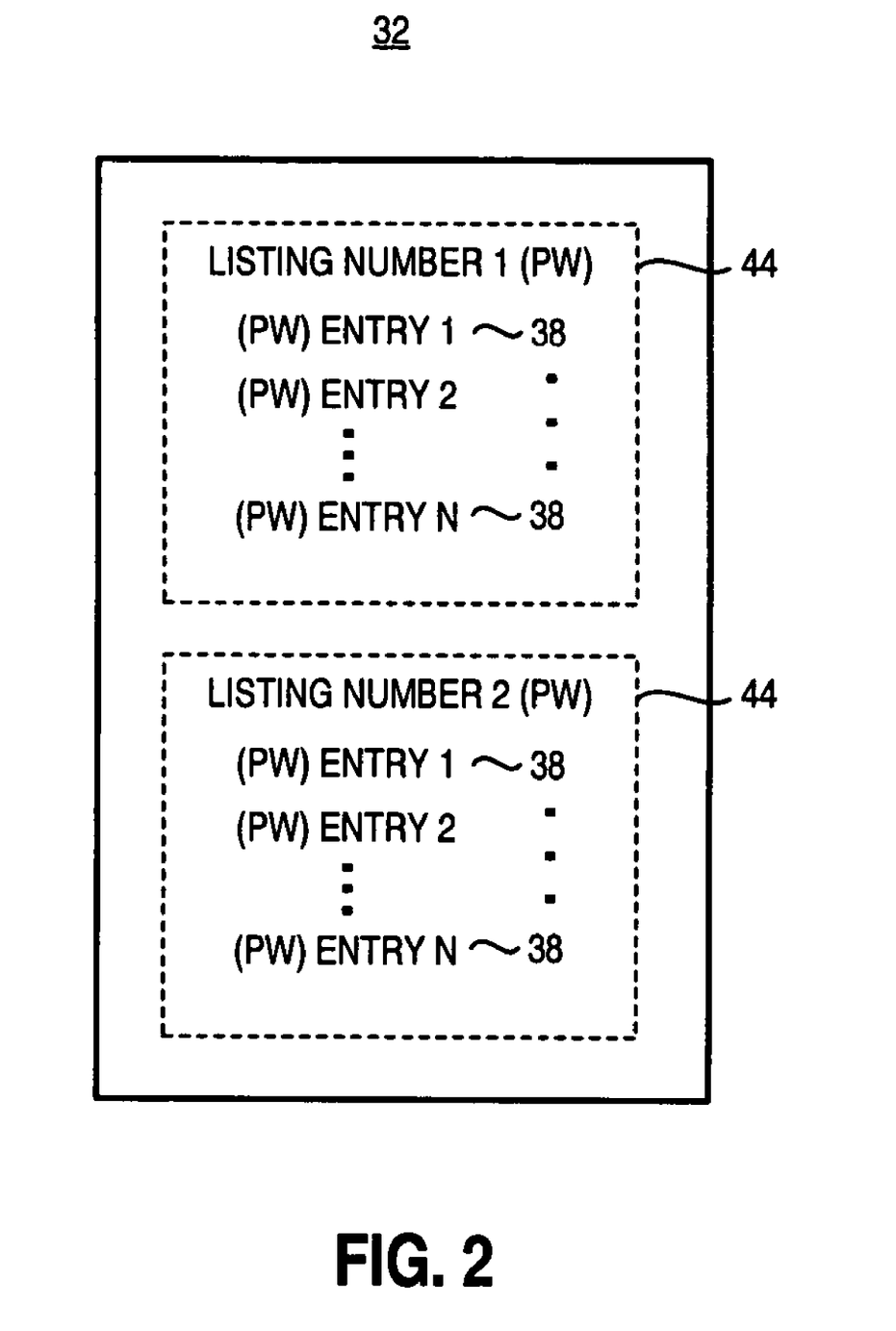
FIG. 2 illustrates a partial message sequence, partial process, diagram representative of operation of the communication system shown in FIG. 1 pursuant to an embodiment of the present invention.

FIG. 2 illustrates the storage element 32 that forms a portion of the apparatus 28 of an embodiment of the present invention. The storage element, in the exemplary implementation, is embodied at a RUIM or (U)SIM card that is removably engageable with the mobile node and the other elements of the apparatus 28 (shown in FIG. 1). Storage locations of the storage element are selectably accessible during operation of the apparatus 28 to retrieve values stored thereat. Additionally, the storage locations are selectably updatable to add, overwrite, and otherwise alter values of the entries stored thereat.

Here, the entries 38 are segregated into two separate listings 44. A first listing 44 is defined by a first set of entries 38 and a second listing 44 is defined by a second set of entries 38. The entries 38 of the first listing identify networks that operate at a 2.4 GHz frequency band. And, the entries 38 of the second listing are of selected networks that operate within the 5.0 GHz frequency band.

During operation of the mobile node, the mobile node monitors selected frequencies within the frequency bands, here the 2.4 and 5.0 GHz frequency bands, to detect the transmission of control signals by networks on selected channels. When the signals are detected, here by the detector 34, the detected values are compared with values contained in the listings 44. The selector 36 performs the comparisons. If a match is located, the mobile node is permitted to attempt to communicate with the associated network. If more than one network is detected and more than one of the detected networks is determined to be contained in one of the listings 44, further selection is made by the selector of with which of the networks that the mobile node shall attempt to communicate. If the mobile node is unable to communicate with the first-selected network, then a subsequent one of the networks with which a match has been determined is selected and the mobile node attempts to communicate with that network. The ordering selected by the selector when more than one network with which the mobile node is permitted to communicate is available is made in any desired fashion. For instance, in one embodiment, one frequency band is preferred to the other. And, if the available networks with which the mobile node is permitted to communicate are operable in the separate frequency bands, the available network in the preferred frequency band is first attempted to be accessed. If communications cannot be effectuated with this first-selected network, then the network of the less preferred frequency band is attempted to be accessed. If more than one network is available within the preferred frequency band with which the mobile node is permitted to attempt to access, then the selection made by the selector of which of the networks with which first to attempt to communicate is made on another basis. For instance, signal strengths, or other communication quality indicia, is used in the selection. Or, an arbitrary selection is made, such as based upon the ordering of the sequence of the entries in the listing. The selector 36 is here shown to be coupled to the transmit part to cause the transmit part to operate to attempt to communicate with the selected network.

Figure 3:
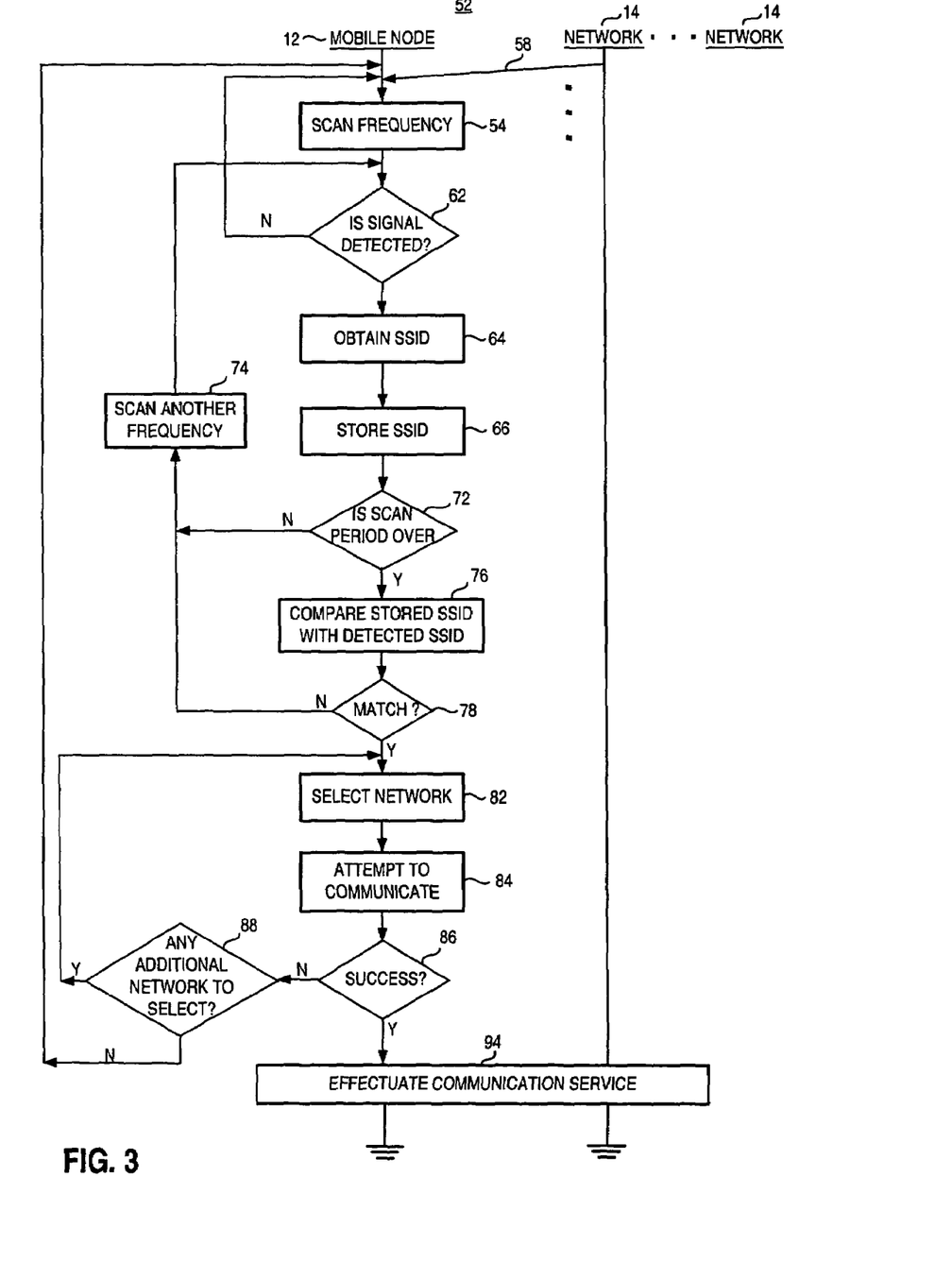
FIG. 3 illustrates a representation of exemplary listings stored at the storage element forming a portion of the mobile node shown in FIG. 1.

FIG. 3 illustrates a representation, shown generally at 52, of operation of the apparatus 28 embodied at the mobile node shown in FIG. 1, together with signaling generated during operation of the communication system.

Operations are performed at the mobile node, including operations that are performed at the apparatus 28 (shown in FIG. 1) forming a portion thereof. During operation of the mobile node, the receive part of the mobile node scans and monitors frequencies, as indicated by the block 54, within the frequency band or bands within which the mobile node is operable.

And, as indicated by the segments 58, signals are broadcast, at least at selected intervals, by networks 14, detectable by the mobile node when the mobile node is within the coverage areas of such networks. The segments 58 are representative of signals broadcast by separate ones of the networks at the selected intervals.

Then, at the decision block 62, a determination is made as to whether signals are detected by the mobile node of the broadcasts of the networks. If not, the no branch is taken, and the mobile node continues to scan the frequencies. If, however, signals are detected, the yes branch is taken to the block 64. Identity information, here SSID values, are extracted from the received signals. And, as indicated by the block 66, the extracted values are stored at the mobile node, such as at a temporary cache maintained at the detector 34 (shown in FIG. 1).

Thereafter, and as indicated by the block 72, a determination is made whether a scan period has been completed. If not, the no branch is taken, and additional channels are monitored, as indicated by the block 74. Otherwise, once the scan period has been completed, the yes branch is taken to the block 76. At the block 76, comparisons are made between the extracted values extracted from the signals received at the mobile node and values contained at the storage element 32 (shown in FIG. 1). And, as indicated by the decision block 78, a determination is made as to whether the comparison results in any matches. If not, the no branch is taken and scanning continues. Otherwise, the yes branch is taken to the block 82. At the block 82, selection is made of with which of the networks whose signals have been detected at the mobile node and whose identities are contained in the storage element 32 (shown in FIG. 1) thereof, with which to attempt to communicate. And, as indicated by the block 84, the mobile node attempts to communicate with the selected network as indicated by the block 84.

A determination is made at the decision block 86 as to whether the attempt to communicate with the selected network is successful. If not, a no branch is taken to the decision block 88, and a further determination is made as to whether any additional networks are available with which the mobile node is permitted to attempt to communicate. If not, the no branch is taken back to the block 54. If, conversely, another network is available with which the mobile node is permitted to attempt to communicate, the yes branch is taken back to the block 82, selection is made, and attempts are made to communicate with the newly-selected network as indicated by the block 84.

When access to a communication network is achieved, the yes branch is taken from the decision block 86, and a communication service, indicated by the block 94, is effectuated. The communication service is, for instance, communication of a data message.

Figure 4:
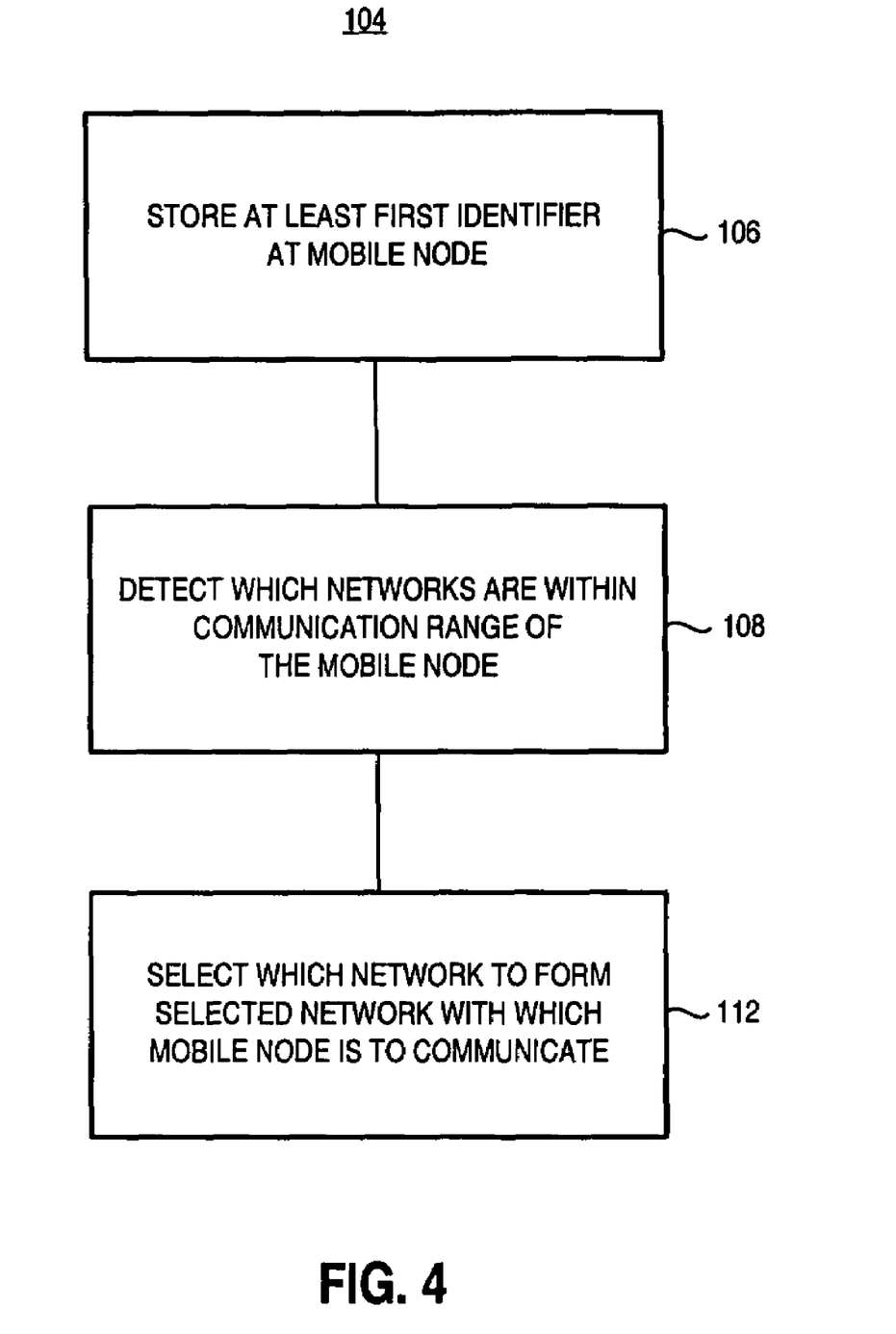
FIG. 4 illustrates a method flow diagram listing the method steps of the method of operation of an embodiment of the present invention.

FIG. 4 illustrates a method flow diagram, shown generally at 104, representative of the method of operation of an embodiment of the present invention. The method facilitates selection of at least a first selected network of a group of networks with which to attempt, by a mobile node, to communicate data.

First, and as indicated by the block 106, at least a first identifier is stored at the mobile node that identifies at least a first selected network. Then, and as indicated by the block 108, detection is made of with which networks of the group of networks are within communication range of the mobile node.

Then, and as indicated by the block 112, selection is made of which, if any, network of the group of networks, to be the first selected network with which to attempt to communicate data. The selection is made of networks, if any, of identities of which are stored at the mobile node and detected to be within communication range of the mobile node.

Because the mobile node is permitted to attempt to communicate only with those networks with which the identities of which are maintained at the mobile node, reduced overhead signaling results as the mobile node does not attempt to communicate with a network with which the mobile node is not permitted to communicate.

The previous descriptions are of preferred examples for implementing the invention, and the scope of the invention should not necessarily be limited by this description. The scope of the present invention is defined by the following claims.

What is claimed is:

1. Apparatus for a mobile node selectably operable to communicate data within at least a first selected frequency band within which a group of networks are operable to communicate pursuant to unregulated use, said apparatus for facilitating selection of at least a first selected network of the group of networks with which to attempt, by the mobile node, to communicate the data, said apparatus comprising:
a storage element embodied at the mobile node, said storage element for storing at least a first identifier identifying the at least the first selected network operable to communicate pursuant to the unregulated use;
a network detector embodied at the mobile node, said network detector for detecting which networks of the group of networks operable to communicate pursuant to the unregulated use are within communication range of the mobile node;
a selector adapted to receive indications of the at least the first identifier stored at said storage element and to receive indications of detections made by said network detector, said selector for selecting which, if any, network, of the group of networks, as the at least the first selected network with which to attempt to communicate the data, selection made by said selector of networks, if any, identified by the at least the first identifier and also detected by said network detector to be within communication range and not to select any networks not identified at said storage element.

2. The apparatus of claim 1 wherein said storage element at which the at least the first identifier is stored comprises a portable memory releasably positionable at the mobile node.

3. The apparatus of claim 2 wherein the portable memory of which said storage element is comprised comprises an identification memory card positionable in releasable engagement with the mobile node such that, when engaged thereat, said selector is coupled to the identification memory card permitting access by said selector of values representative of the at least the first identifier stored at the identification memory card.

4. The apparatus of claim 1 wherein said storage element comprises a non-permanent memory, the at least the first identifier stored at the non-permanent memory of which said storage element is comprised at least selectably updatable.

5. The apparatus of claim 4 wherein the radio communication system comprises a network part selectably for sending storage-element update information to the mobile node, said apparatus further comprising an update information detector, said update information detector for detecting the storage-element update information sent to the mobile node and for causing the storage-element update information to be stored at said storage element.

6. The apparatus of claim 5 wherein the storage-element update information selectably comprises additive information and wherein said update information detector causes the storage-element update information forming the additive information to be added to the non-permanent memory of which said storage element is comprised.

7. The apparatus of claim 5 wherein the storage-element update information selectably comprises replacement information and wherein said update information detector causes the storage-element update information forming the replacement information to replace the at least the first identifier stored at said storage element.

8. The apparatus of claim 1 wherein at least a first listing is defined at said storage element, the first listing formed of the at least the first identifier that identifies the at least the first selected network.

9. The apparatus of claim 8 wherein the at least the first selected frequency band within which the mobile node is selectably operable to communicate data comprises the first selected frequency band and a second selected frequency band and wherein the at least the first listing defined at said storage element comprises the first listing and a second listing, the at least the first identifier identifying the first network contained at the first listing and a second identifier identifying a second network contained at the second listing, the first network operable within the first frequency band and the second listing operable within the second frequency band.

10. The apparatus of claim 9 wherein said storage element is at least selectably updatable and wherein the first and second listings, respectively, further have associated therewith at least a first password, said apparatus further comprising a storage element updater adapted to receive update information and update-password information, said storage element updater for comprising values of the update-password information with the at least the first password and selectably further for updating an appropriate one of the first and second listings.

11. The apparatus of claim 10 wherein the at least the first password comprises a fast-listing password and a second-listing password and wherein said update-password information is compared by said storage element updater with at least a selected one of the first-listing and second-listing passwords.

12. The apparatus of claim 8 wherein said storage element is at least selectably updateable and wherein the first listing defined at said storage element has at least a first password associated therewith, said apparatus further comprising a storage element updater adapted to receive update information and update-password information, said storage element updater for comparing values of the update-password information with the at least the first password.

13. The apparatus of claim 12 wherein the at least the first password is associated with the at least the first identifier and wherein said storage element updater selectably updates the at least the first identifier responsive to comparison made by said storage element updater.

14. The apparatus of claim 1 wherein each network of the group of networks comprises a wireless local area network, wherein each wireless local area network identified by a service set identifier, and wherein each wireless local area network selectably broadcasts network-identification signals containing indications of the service set identifiers, said network detector for detecting the network-identification signals.

15. In a method of communicating in a radio communication system having a mobile node selectably operable to communicate data within at least a first selected frequency band within which a group of networks are operable to communicate pursuant to unregulated use, said method for facilitating selection of at least a first selected network of the group of networks with which to attempt, by the mobile node, to communicate the data, said method comprising:
  storing at the mobile node at least a first identifier identifying the at least the first selected network operable to communicate pursuant to the unregulated use;
  detecting which networks of the group of networks operable to communicate pursuant to the unregulated use are within communication range of the mobile node;
  selecting which, if any, network of the group of networks as the at least the first selected network with which to attempt to communicate the data, selection made of networks, if any, both stored during said operation of storing and also detected during said operation of detecting and not selecting any networks not stored during said operation of storing.

16. The method of claim 15 further comprising the operations of providing storage-element update information to the mobile node and selectably updating identifications of the at least the first identifier stored at the mobile node.

17. The method of claim 16 wherein at least a first password is associated with the at least the first identifier, wherein an update-information password is further associated with the storage-element update information and wherein said method further comprises the operation of comparing the first password with the update-information password.

18. The method of claim 15 wherein each network of the group of networks is identified by a network identity, wherein each network broadcasts network-identity signals, and wherein said operation of detecting comprises detecting network-identity signals of networks within range of the mobile node.

19. The method of claim 18 wherein the networks of the group of networks comprise wireless local area networks, wherein the network identity the identifies each of the networks comprises a service set identifier and wherein said operation of detecting comprises detecting values of the service set identifiers contained in the network-identity signals.

20. The method of claim 15 wherein said operation of selecting comprises selecting one network of a plurality of networks when the plurality of networks identities of which are stored during said operation of storing are also detected during said operation of detecting.

* * * * *